US008231307B2

(12) United States Patent
    Püttmann

(10) Patent No.: US 8,231,307 B2
(45) Date of Patent: Jul. 31, 2012

(54) SYSTEM AND METHOD FOR TIGHTENING STRING SECTIONS TO FORM A STRING

(75) Inventor: Franz-Josef Püttmann, Lennestadt (DE)

(73) Assignee: Tracto-Technik GmbH, Lennestadt (DE)

( * ) Notice: Subject to any disclaimer, the term of this patent is extended or adjusted under 35 U.S.C. 154(b) by 739 days.

(21) Appl. No.: 12/094,362

(22) PCT Filed: Oct. 25, 2006

(86) PCT No.: PCT/EP2006/010260
    § 371 (c)(1),
    (2), (4) Date: May 20, 2008

(87) PCT Pub. No.: WO2007/057089
    PCT Pub. Date: May 24, 2007

(65) Prior Publication Data
    US 2009/0003935 A1    Jan. 1, 2009

(30) Foreign Application Priority Data

Nov. 21, 2005 (DE) .......................... 10 2005 055 764
Jul. 21, 2006 (DE) .......................... 10 2006 033 753

(51) Int. Cl.
    *F16L 1/09*    (2006.01)
    *F16L 1/10*    (2006.01)
(52) U.S. Cl. ................. 405/184.1; 405/184.4; 254/29 R
(58) Field of Classification Search ............... 405/184.1, 405/184.4, 184.5; 254/29 R
    See application file for complete search history.

(56) References Cited

U.S. PATENT DOCUMENTS

| 3,512,246 | A | * | 5/1970 | Messano ........................ 29/525 |
| 3,762,174 | A |   | 10/1973 | Fiske et al. |
| 4,389,763 | A | * | 6/1983 | Marsh, Jr. ........................ 29/237 |
| 5,048,793 | A | * | 9/1991 | Mefford et al. ............. 254/29 R |
| 5,069,426 | A | * | 12/1991 | Gabrysch .................... 254/29 R |
| 5,368,413 | A | * | 11/1994 | Moore ........................ 405/184.5 |
| 5,642,786 | A |   | 7/1997 | Püttmann et al. |
| 5,895,176 | A |   | 4/1999 | Puttmann |
| 6,267,187 | B1 | * | 7/2001 | Puttmann et al. ............. 175/122 |
| 6,364,036 | B1 | * | 4/2002 | Puttmann ........................ 175/52 |
| 6,588,983 | B1 | * | 7/2003 | Tenbusch, II ............. 405/184.3 |
| 6,969,217 | B1 | * | 11/2005 | Basinger .................... 405/184.5 |
| 2005/0281622 | A1 | * | 12/2005 | Basinger .................... 405/184.5 |
| 2007/0284149 | A1 | * | 12/2007 | Koch et al. .................... 175/267 |

FOREIGN PATENT DOCUMENTS

| DE | 30 24 495 A1 | 1/1981 |
| DE | 196 08 056 C1 | 3/1996 |
| DE | 202004005461 U1 | 4/2004 |
| DE | 102004033566 B3 | 7/2004 |
| FR | 2 460 407 | 1/1981 |

* cited by examiner

*Primary Examiner* — Tara Mayo-Pinnock
(74) *Attorney, Agent, or Firm* — Henry M. Feiereisen; Ursula B. Day

(57) ABSTRACT

A tensioning device in particular for bracing string sections of a string includes a traction element, which extends between an abutment and an adapter on the rear end of the string. A linear tensioning device is arranged in parallel relationship to the string for applying the tension force. A sliding brake engages the traction element in a self-locking manner in sole response to a tensile load applied by the linear tensioning drive to thereby allow the tensioning device to move on its own in a direction on the traction element.

4 Claims, 3 Drawing Sheets

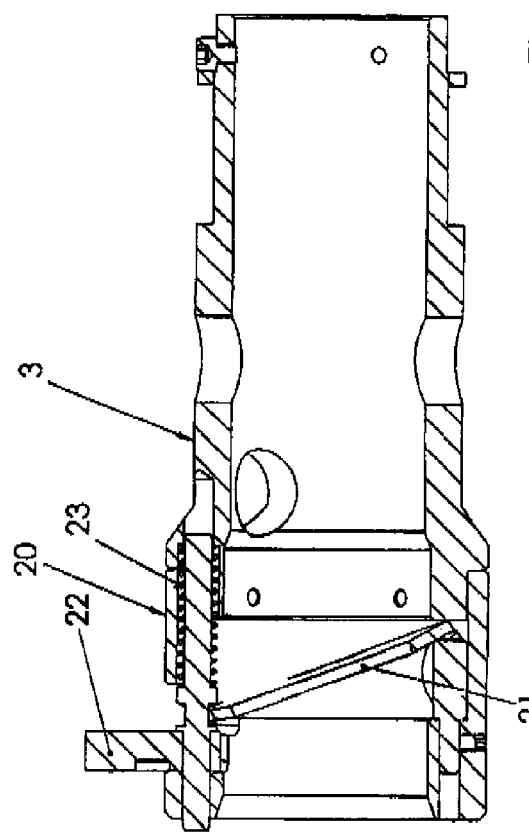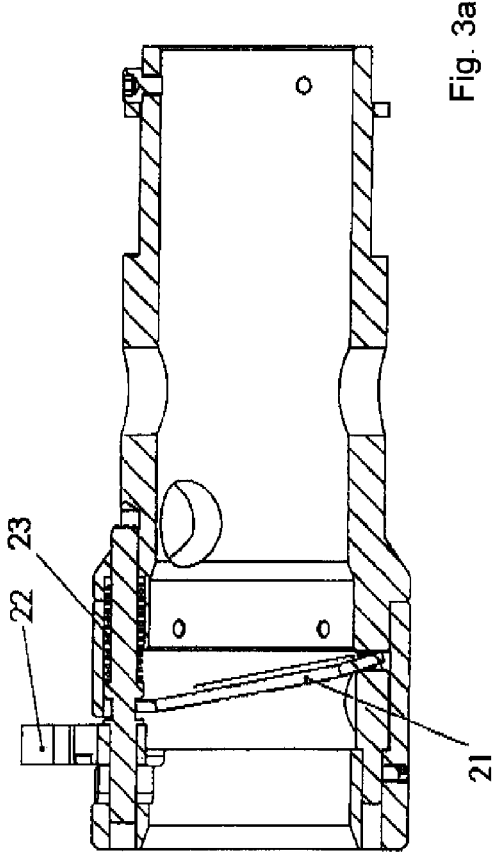

SYSTEM AND METHOD FOR TIGHTENING STRING SECTIONS TO FORM A STRING

BACKGROUND OF THE INVENTION

The invention relates to the bracing of string sections, in particular pipe sections, to form a string, including a traction element which extends between an abutment on a forward end of the pipe string and an adapter on the rearward end thereof, a linear tensioning drive for applying a tension force, and a device for moving the tensioning drive out of a section.

Corresponding systems are oftentimes used for the trenchless pipe installation or renewal, for example to brace the pipe string comprised of individual pipe sections and to connect it with a leading drilling or bursting tool as clearance-free as possible.

Such a system is known, for example, from DE 196 08 056 C1 or U.S. Pat. No. 5,895,176.

A bursting tool is disclosed there which is pulled through an old pipe to be replaced. As the bursting tool advances through the old pipe, the old pipe is destroyed while at the same time a new pipe string is drawn into the ground. The newly-inserted pipe string is comprised of single short pipe sections.

In order to reduce friction during insertion, the pipe sections of the new pipe string have smooth sleeve joints on the outside and inside. These sleeve joints are, however, incapable to transmit tensile forces, requiring the provision of a tensioning device to realize a substantially play-free connection of the pipe string with the bursting tool.

The tensioning device acts upon a cable or a chain which is secured to the bursting tool and guided through the new pipe to be drawn in.

Disposed in the rearward end of the pipe string is the actual tensioning device which is supported on the rearward end of the last pipe section via an adapter.

The cable or chain is tightened by hydraulic cylinders which are arranged perpendicular to the cable or chain because of the tight space conditions that are frequently experienced in the working shafts. The cable or chain is hereby deflected in length direction of the hydraulic cylinder by a defection roller which is provided with a freewheel. The freewheel of the deflection roller prevents springback of the taut cable or taut chain when several cylinder strokes are necessary to attain a complete tensioning operation.

The tensioning device described in DE 196 08 056 C1 has many drawbacks.

As the deflection is required as a result of the vertical disposition of the cylinders, the use of flexible chains or cables is necessary as traction members which, when exposed to high tension forces, undergo, however, a significant length extension which must be compensated by the tensioning device. This is disadvantageous because the tensioning device must be detached each time a new pipe section is threaded on so that the elongated traction member is relieved and strained again during each tensioning cycle.

A further drawback of the afore-described tensioning device is the need for large space which it needs to occupy especially within a reversing shaft which oftentimes represents the starting point for replacing old pipes.

A further drawback of tensioning devices, using a cable or a chain as traction member is normally the need for the cable or chain to have an overall length which is at least as long as the pipe string to be drawn in. The pipe sections must be threaded over a long path onto the traction member, in particular when the pipe renewal process begins.

DE 10 2004 033 566 B3 describes a device for bracing pipe section to form a pipe string, including a traction element, which extends between an abutment on the forward end of the pipe string and an adapter on the rearward end thereof, and a linear tensioning drive for applying a tension force. The system is characterized by the parallel disposition of the linear tensioning drive in relation to the pipe string, whereby one side of the linear tensioning drive is supported on the adapter and the other side is supported on the traction element via at least one holding element.

This enables the linear tensioning drive to be arranged in part also within the pipe string to be installed and reduces the space demand of the tensioning device.

On the other hand, the tensioning device must be moved on the traction element or detached from the traction element in order to add another pipe section to the pipe string. This is done heretofore by hand.

SUMMARY OF THE INVENTION

The invention is thus based on the object to improve known tensioning devices in such a way that the tensioning device can easily be moved upon or detached from the traction element.

This object is solved in accordance with the present invention by the subject matter of the independent claims. Advantageous embodiments are set forth in the subclaims.

The solution according to the invention provides for a sliding brake which engages the traction element in one direction in a self-locking manner. Self-locking, which causes a fixation of the sliding brake on the traction element, is effective in this operative position in one direction only and is triggered and maintained by the tension force of the tensioning drive (preferably, when the tensioning drive contracts) so as to allow a spontaneous movement of the tensioning drive or tensioning device in this direction on the traction element. The tensioning drive or tensioning device is able for example to withdraw from the respective pipe section, with the assistance of the sliding brake. As a result, there is no need for a manual extraction of the tensioning drive or tensioning device. Threading the tensioning device onto the traction element can be carried out while the sliding brake has been switched to a freewheeling position.

The term "sliding brake" is to be understood in particular as relating to any geometric configuration of a fastening member which, if need be, is movable on or at the traction member. Examples include a sliding sleeve or also a sliding shoe, i.e. a fastening member configured without ring closure.

The sliding brake according to the invention may be tubular for example and have a clamping ring through which the traction element extends. The clamping ring can be arranged in the sliding brake such that it can be brought by an operating lever to a slanted disposition in relation to the traction element so as to effect a self-locking engagement on the traction element as soon as the sliding brake is moved in one direction on the traction element. As the operating lever is released, the sliding brake can then freely move again on the traction element.

The term linear tensioning drive is to be understood in particular as relating to a drive unit which is able to produce a relative movement along an action line of two points of articulation connected to the drive unit. Examples include in particular hydraulically or pneumatically operated cylinders, with the cylinder jacket movable relatively and linearly to the piston rod. A further example of such a linear drive involves a combination of rotary motor and toothed rack. One point of articulation for force support is hereby on the rotary motor and the other one on the tooted rack. Also possible is the use of a threaded rod for a linear tensioning drive.

The solution according to the invention is not limited to a tightening of pipe sections with closed circumference. Rather, all elements can be tightened which form a string when placed behind one another for guiding a traction element or having a traction element guided thereon.

Support of the linear tensioning drive on the adapter or traction element (via the holding element(s)) may be implemented directly or indirectly via further interposed elements.

The term "sleeve" is in particular to be understood within the scope of the invention as relating to all elements which allow connection to the traction element and as a result transmit forces at least in a length direction of the traction element as well as transversely thereto. The sleeve may include in particular within the scope of the invention also a square, V-shaped or U-shaped cross section.

The device according to the invention can be used especially advantageously to tighten a string of individual pipe sections on a pull-in device designed for trenchless installation of pipes. This involves in particular statically and/or dynamically propelled upsizing, bursting, or drilling tools which may be of self-propelled configuration of propelled externally.

The tensioning device according to the invention may be used however with any type of abutment that allows a securement of a traction element and support of the forward end of the pipe string.

According to a preferred embodiment of the invention, the traction element is constructed in the form of a string of rods comprised of single rod members. This allows length adjustment of the traction element as the new pipe is drawn in, whereby the length of the old pipe is prolonged by continuously adding individual pipe sections. New pipe sections can be threaded onto the free end of the traction element in a much easier manner.

Furthermore, the use of a string of rods has the advantage that stretching of the rod can be kept small enough by suitable shaping and material selection so as to have no perceivable effect on the tightening operation.

The use of a string of rods as traction element is further advantageous because e constructive features can easily be integrated to ensure a formfitting connection with elements of the tensioning device. Also possible in an advantageous manner is a force-locking connection with a rigid string of rods. In particular advantageous is the presence of one of more openings or elevations in the rod members which form the traction element for providing a formfitting connection with the holding element of the tensioning drive or the sleeve.

The terms "openings" or "elevations" should relate in particular to all constructive features which ensure a formfitting connection. Examples include in particular holes or blind bores within the rod elements. Furthermore, grooves of any shape may be provided. Examples of elevations include in particular all protrusions which result in the formfitting connection by bearing against an edge of the sleeve.

Especially advantageous is the arrangement of openings or elevations at regular distances on the rod members.

According to an advantageous embodiment of the present invention, the tensioning drive includes one or more pneumatically or hydraulically driven cylinders, with the first end of the cylinder(s)—for example the cylinder jacket—being supported on the adapter, and the second end—in the present example the piston rod—being supported on the traction element via the holding element in a formfitting and/or force-locking manner.

The drive cylinder(s) may be constructed in ring shape, whereby cylinder jacket and/or cylinder piston may have a longitudinal axial opening through which the traction element and other elements of the tensioning device can be guided.

According to an advantageous embodiment, the tensioning device has a section whose outer diameter is or can be suited to the inner diameter of the pipe sections. As a result, the traction element as well as the tensioning device can be centered within the pipe string. The diameter of this section can be adjusted for example by attaching different adapters. It is of advantage to arrange the adjusted diameter, in relation to the pipe adapters, on the one side and the holding element on the respectively opposite side.

The device according to the invention enables execution of a method of bracing individual pipe sections to form a pipe string, with a traction element being secured to an abutment. Then, one or more pipe sections are threaded onto the traction element. A tensioning device with an adapter as well as a linear tensioning drive is placed over the traction element. The linear tensioning drive is hereby supported on the one side upon the adapter and on the other side upon the traction element by means of one or more holding elements. Thereafter, the holding element is fixed on the traction element in a position which moves the adapter advantageously into proximity of the last pipe section. The adapter is moved in relation to the holding element as the tensioning drive is tightened. The tensioning device is again moved away from the traction element after the tightening operation with the assistance of a sliding brake.

When advantageously using tensioning cylinders for the tensioning device with a short stroke, several tensioning cycles of the tensioning drive may be provided for a tightening operation for the pipe string.

BRIEF DESCRIPTION OF THE DRAWING

Exemplary embodiments of the invention will now be explained in greater detail with reference to the drawings.

The drawings show in:

FIG. 3 a sectional view of the sliding brake of FIG. 2 in idle position; and

FIG. 3a a sectional view of the sliding brake of FIG. 2 in locking position with the rod element.

DETAILED DESCRIPTION OF PREFERRED EMBODIMENTS

Figure 1:
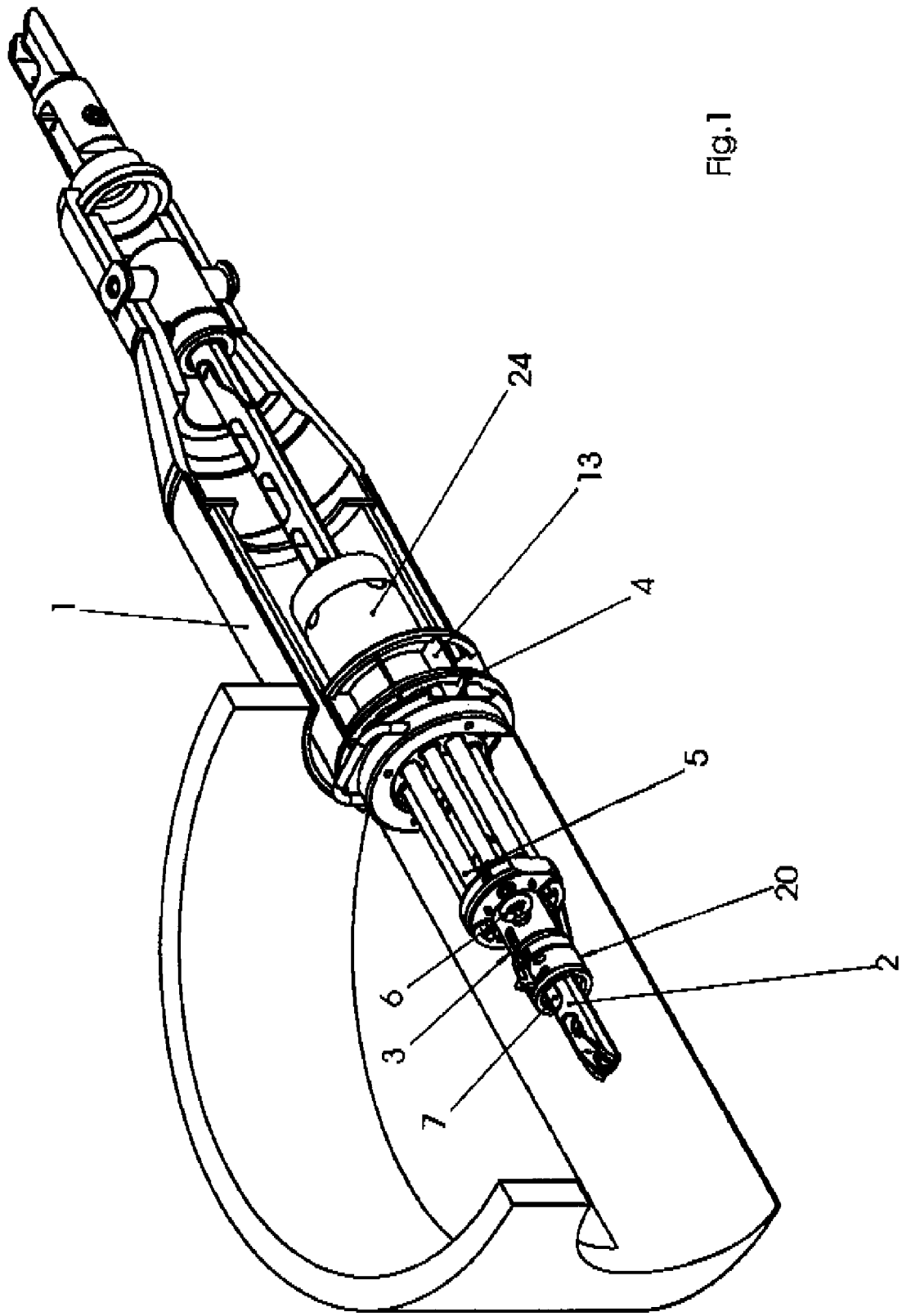
FIG. 1 a fragmentary view of a system according to the invention for tightening pipe sections with a sliding brake.
Figure 2:
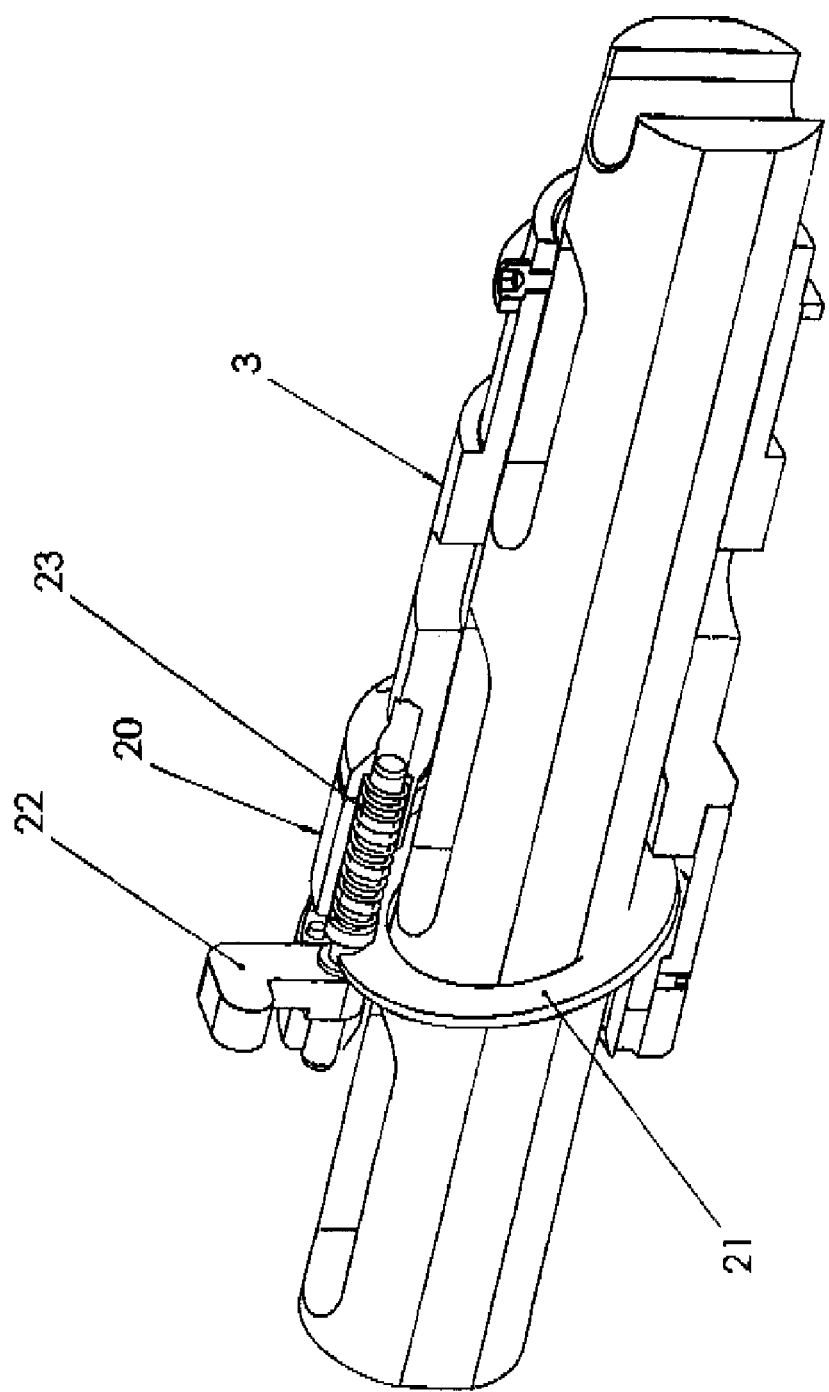
FIG. 2 a preferred embodiment of the sliding brake according to the invention.

The tensioning device is provided to brace individual pipe sections, which have been threaded onto a traction element 2, on a (not shown) device for drawing-in pipes, with the sliding brake 20 according to the invention allowing the tensioning device to move on its own out of the braced pipe section 1.

The tensioning device essentially includes a locking sleeve 3 with anteriorly disposed sliding brake 20 as well as a unit which is movable in relation to the sliding brake 20 and includes an adapter 4 and several hydraulic cylinders 5.

The pipe string is tightened by placing the tensioning device over the traction rod 2 until the adapter 4 is situated in proximity of the free end of the last pipe sections. Thereafter, the locking sleeve 3 is form fittingly connected with the rod 2 by inserting a pin 6 which locks in one of several through openings 7 in the rod 2. The tensioning device is thus roughly positioned.

The actual tightening of the pipe string is realized by the tensioning device itself. The hydraulically driven tensioning cylinders 5 move hereby out, with the adapter 4 pressing the rearward most pipe section 1 in the direction of the remaining pipe sections 1.

The tensioning device is initially released in order to add a new pipe section 1 to the pipe string. The hydraulic cylinders 5 fully pull back hereby.

The insertable pin 6 for connecting the locking sleeve 3 with the traction rod 2 is then removed and the anteriorly disposed sliding brake 20 assumes its operative position. The sliding brake 20 has a tubular configuration with an internally supported clamping ring 21. The traction element 2 extends through the sliding brake and the clamping ring 21. Actuating an operating lever 22 allows release of the clamping ring 21 from an idle position, shown in FIG. 3, to an operative position, in which the clamping ring 21 is tilted by means of a spring 23. Tilting of the clamping ring 21 causes the clamping ring 21 to get wedged on the traction element 2 when a tension force is applied by the tensioning drive 24 of the tensioning device, while a thrust force, generated by the tensioning drive 24 moves the sliding brake 20 on the traction element 2. As a result, the tensioning device is able to extract itself in increments from the pipe string.

A new pipe section 1 can then be threaded onto the rod 2 and the tensioning device can be attached again.

Arranged on the side of the locking sleeve 3, which projects into the last pipe section 1, are spacers 13 which are defined by a diameter in correspondence to the inner diameter of the pipe sections 1 and provided to center the locking sleeve 3 and the traction rod 2 within the pipe section 1. This section of the sleeve 3 can be suited to different inner pipe diameters by attaching different adapters (not shown).

What is claimed is:

1. A device for tightening string sections of a string, comprising:
    a traction element disposed at a rear end of the string;
    a linear tensioning drive constructed for detachable engagement to the traction element and application of a tension force to tighten the string sections of the string; and
    a sliding brake operatively connected to the linear tensioning drive and movable from an idle position to an operative position in which the sliding brake is able to engage with and disengage from the traction element, thereby allowing the tensioning drive to extract itself in increments from the string by alternately applying a tensile force and thrust force upon the sliding brake,
    wherein the linear tensioning drive has an adapter for placement against a rearmost one of the string sections, a locking sleeve disposed at a distance to the adapter and constructed for engagement in the traction element, and a hydraulic cylinder assembly acting between the adapter and the locking sleeve to effect a tightening, when the locking sleeve engages the traction element.

2. The device of claim 1, wherein the traction element has an opening or elevation for formfitting connection with the locking sleeve.

3. A device for tightening string sections of a string, comprising:
    a traction element disposed at a rear end of the string;
    a linear tensioning drive constructed for detachable engagement to the traction element and application of a tension force to tighten the string sections of the string; and
    a sliding brake operatively connected to the linear tensioning drive and movable from an idle position to an operative position in which the sliding brake is able to engage with and disengage from the traction element, thereby allowing the tensioning drive to extract itself in increments from the string by alternately applying a tensile force and thrust force upon the sliding brake, said sliding brake having a clamping ring arranged at an inclination which changes in response to a force application by the tensioning drive,
    wherein the sliding brake has a spring acting on the clamping ring to allow a spontaneous return of the clamping ring to the idle position.

4. The device of claim 3, wherein the sliding brake has an operating lever which is operatively connected to move the clamping ring to permit a movement of the clamping ring from the idle to the locking positions.

* * * * *